(12) United States Patent
Snijder Van Wissenkerke et al.

(10) Patent No.: US 12,215,573 B2
(45) Date of Patent: Feb. 4, 2025

(54) METHOD AND SYSTEM FOR STEALTH MODE OPERATION OF A DRILLING RIG

(71) Applicant: Patterson-UTI Drilling Company LLC, Houston, TX (US)

(72) Inventors: Marcel Snijder Van Wissenkerke, Houston, TX (US); Ronald Barbee, Houston, TX (US); Nathaniel Norris, Houston, TX (US); Faramarz Motallebzadeh, Houston, TX (US); Johnathan Eichelman, Houston, TX (US)

(73) Assignee: Patterson-UTI Drilling Company LLC, Houston, TX (US)

( * ) Notice: Subject to any disclaimer, the term of this patent is extended or adjusted under 35 U.S.C. 154(b) by 0 days.

(21) Appl. No.: 18/307,399

(22) Filed: Apr. 26, 2023

(65) Prior Publication Data
US 2024/0360741 A1    Oct. 31, 2024

(51) Int. Cl.
*E21B 41/00* (2006.01)
*H02J 3/28* (2006.01)
*H02J 3/38* (2006.01)

(52) U.S. Cl.
CPC ............ *E21B 41/0085* (2013.01); *H02J 3/28* (2013.01); *H02J 3/381* (2013.01)

(58) Field of Classification Search
CPC ........ E21B 41/0085; E21B 4/04; E21B 44/00; H02J 3/28; H02J 3/32; H02J 3/381; H02K 7/18
See application file for complete search history.

(56) References Cited

U.S. PATENT DOCUMENTS

| 8,446,037 | B2 | 5/2013 | Williams |
| 9,059,587 | B2 | 6/2015 | Williams |
| 9,065,300 | B2 | 6/2015 | Williams |
| 10,658,841 | B2 * | 5/2020 | Poon ................. H02J 13/00002 |
| 2011/0074165 | A1 * | 3/2011 | Grimes ............... F02D 41/1446 |
| | | | 290/40 C |
| 2013/0271083 | A1 | 10/2013 | Williams |

* cited by examiner

*Primary Examiner* — Daniel P Stephenson
(74) *Attorney, Agent, or Firm* — AVEK IP, LLC

(57) ABSTRACT

A method of operating a drilling rig (that includes electrically powered equipment) and an energy supply system (that includes a battery storage, one or more generators, and an electrical bus that powers the drilling rig) includes: determining, by the energy supply system, a power demand of the drilling rig; comparing the power demand to a battery power threshold. When the power demand is less than or equal to the battery power threshold, the energy supply system enters a stealth mode by deactivating and disconnecting all generators from the electrical bus and powering the electrical bus and the drilling rig with only the battery storage. When the power demand is greater than the battery power threshold, the energy supply system powers the electrical bus with at least one of the one or more generators. The battery power threshold is based on a maximum power output rating of the battery storage.

20 Claims, 10 Drawing Sheets

*- PRIOR ART -*

METHOD AND SYSTEM FOR STEALTH MODE OPERATION OF A DRILLING RIG

BACKGROUND

Countries and companies around the globe are becoming increasingly focused on understanding their contribution to greenhouse gas emissions and reducing their carbon footprint. In the oil and gas industries, one source of emissions is the diesel or natural gas-powered generators that constitute the energy supply system (i.e., power source) of drilling rigs. When these generators run at low load, the diesel or natural gas-powered engines that power the generators have poor efficiency and higher emissions (e.g., carbon dioxide, carbon monoxide, nitrogen oxides, total hydrocarbons, and particulate matter). A method and system that avoids or reduces such low load conditions may be desirable, for example, to improve overall fuel consumption and reduce the excessive emissions associated with the poor efficiency of operating generators at low load.

SUMMARY

In general, one or more embodiments of the invention relate to a method for operating a drilling rig (that includes electrically powered equipment) and an energy supply system (that includes a battery storage, one or more generators, and an electrical bus that powers the drilling rig). The method includes: determining, by the energy supply system, a power demand of the drilling rig; and comparing the power demand to a battery power threshold. When the power demand is less than or equal to the battery power threshold, the energy supply system enters a stealth mode by deactivating and disconnecting all generators from the electrical bus and powering the electrical bus and the drilling rig with only the battery storage. When the power demand is greater than the battery power threshold, the energy supply system powers the electrical bus with at least one of the one or more generators. The battery power threshold is based on a maximum power output rating of the battery storage.

In general, one or more embodiments of the invention relate to an energy supply system for operating a drilling rig that includes electrically powered equipment. The energy supply system includes: an electrical bus that powers the drilling rig; a battery storage that is configured to draw power from and supply power to the electrical bus; one or more generators that are configured to supply power to the electrical bus; and a computer system. The computer system: determines a power demand of the drilling rig; and compares the power demand to a battery power threshold. When the power demand is less than or equal to the battery power threshold, the computer system commands the energy supply system to enter a stealth mode by deactivating and disconnecting all generators from the electrical bus and powering the electrical bus and the drilling rig with only the battery storage. When the power demand is greater than the battery power threshold, the computer system commands the energy supply system to power the electrical bus with at least one of the one or more generators. The battery power threshold is based on a maximum power output rating of the battery storage.

In general, one or more embodiments of the invention relate to a non-transitory computer readable medium (CRM) storing computer readable program code for operating a drilling rig (that includes electrically powered equipment) and an energy supply system (that includes a battery storage, one or more generators, and an electrical bus that powers the drilling rig). The computer readable program code causes a computer system to: determine a power demand of the drilling rig; and compare the power demand to a battery power threshold. When the power demand is less than or equal to the battery power threshold, the computer system commands the energy supply system to enter a stealth mode by deactivating and disconnecting all generators from the electrical bus and powering the electrical bus and the drilling rig with only the battery storage. When the power demand is greater than the battery power threshold, the computer system commands the energy supply system to power the electrical bus with at least one of the one or more generators. The battery power threshold is based on a maximum power output rating of the battery storage.

Other aspects of the invention will be apparent from the following description and the appended claims.

DETAILED DESCRIPTION

Figure 1:
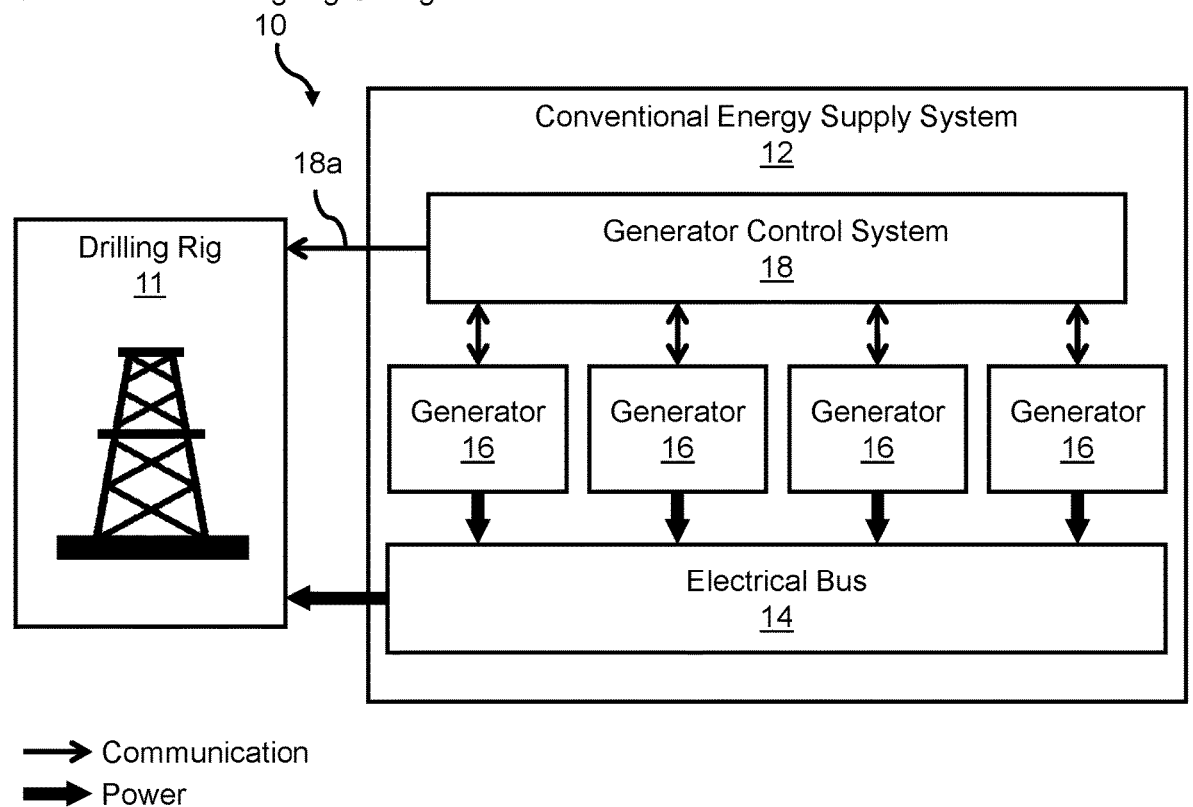
FIG. 1 schematically shows a conventional drilling rig configuration equipped with a conventional energy supply system.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

The operation of a drilling rig consumes a significant amount of energy to perform various operations such as drilling, pumping of drilling mud, tripping or hoisting pipe, supplying fuel to generator systems, and other auxiliary processes. Each operation may have unique power requirements including duration, peak power requirement, and power requirement profile over time. Because the total power requirement of a drilling rig varies over time depending on which operations are active, a typical energy supply system provides power on demand by operating a number of fuel-based generators. Because the generators consume a large amount of fuel (e.g., 550,000-650,000 gallons of fuel per year for a single conventional land drilling rig), maximizing efficiency of the energy supply system and minimizing runtime of the fuel-based generators is desirable.

FIG. 1 schematically shows a conventional drilling rig configuration (10).

The conventional drilling rig configuration (10) includes a drilling rig (11), and a conventional energy supply system (12). Each of these components is described in further detail below.

The drilling rig (11) may be any type of drilling rig as it may be used in the oil & gas industries. The drilling rig (11) may include electrically powered equipment such as, for example, a top drive for operating a drill string, one or more mud pumps for pumping of drilling mud, a drawworks for tripping or hoisting pipe, one or more fuel pumps for supplying fuel to generator systems, and/or other auxiliary equipment that generates load demand (e.g., lights, low horsepower motors, etc.).

The electrically powered equipment of the drilling rig (11) receives electrical power from an electrical bus (14) of the conventional energy supply system (12). The electrical bus (14) is powered (i.e., energized) by one or more generators (16) that can each be independently activated/de-activated.

Each generator (16) may include an engine control unit (ECU), a fuel-based engine that produces a braking power (bkW), and a breaker that connects/disconnects the generator (16) from the electrical bus (14). The output of the generator (16) is quantified as a usable electrical power (ekW) that is always lower than the braking power due to parasitic losses (e.g., field losses of the generator, friction and windage losses, using power to drive a radiator fan) and efficiency losses (e.g., incomplete combustion of fuel). As discussed in further detail below with respect to FIGS. 2A-2B, efficiency losses and emissions are known to heavily depend on the load of the generator (16).

Typically, the number of active (i.e., online) generators (16) is manually controlled by the operators of the drilling rig (11). In other words, the conventional energy supply system (12) does not receive power demand information from the drilling rig (11) and cannot automatically control the number of active generators (16). The operators of the drilling rig (11) must anticipate the power requirements of the active operations and bring a predetermined number of generators (16) online to meet the requirements.

A generator control system (18) controls the one or more generators (16) that are online and connected to the electrical bus (14). The generator control system (18) operates on a closed loop that uses voltage and frequency information from the electrical bus (14) to regulate the throttle setting of the generators (16) and maintain a consistent power profile (e.g., 60 Hz and 600 V) to match the variable load demanded by the drilling rig (11). For example, if a pump on the drilling rig (11) is turned on, the excitation on the generator fields will increase, resulting in an increased load. On the other hand, if rotating equipment slows down, the generators (16) naturally decrease their load. Note that power transmission is unidirectional from the conventional energy supply system (12) to the drilling rig (11). At best, a conventional generator control system (18) may provide a load information (18a) to the drilling rig (11) (i.e., unidirectional communication) such that operators can determine whether generators (16) may need to be activated or deactivated to match demand.

Figure 2A:
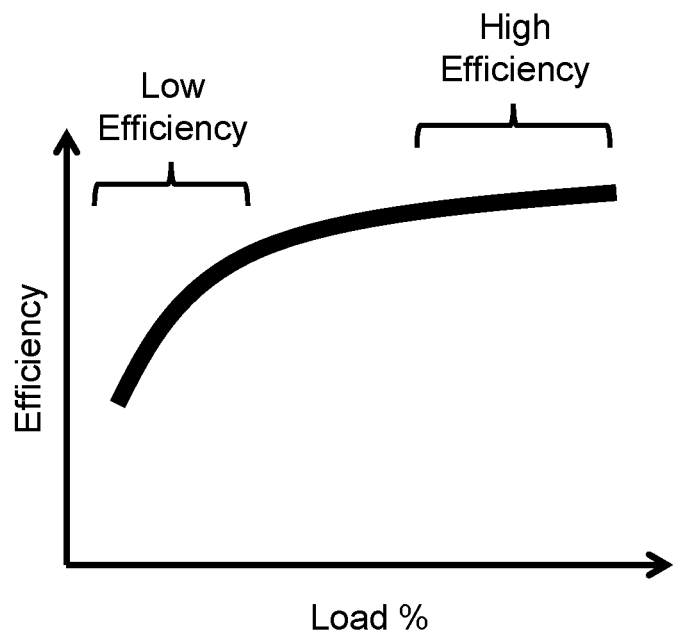
FIG. 2A-2B show efficiency and emissions trends for conventional generators.
Figure 2B:
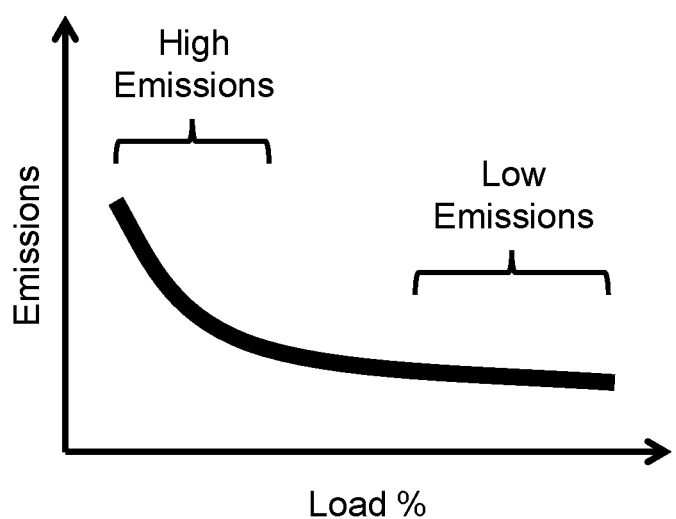

FIG. 2A-2B show efficiency and emissions trends versus generator load.

In general, fixed-speed diesel engines and natural gas engines (e.g., the power producing component of the generators (16)) are optimized to efficiently burn fuel and reduce emissions when operating at higher loads. As shown in FIG. 2A, operating at lower loads results in a low generator power factor (i.e., a measure of efficiency). Furthermore, operating at low loads for long periods of time may have other negative effects, such as incomplete fuel combustion due to low cylinder temperatures. Incomplete fuel combustion results in unburned fuel being passed into the exhaust of the generator (16), potential damage to the generator (16), and lower power efficiency.

As shown in FIG. 2B, operating at lower loads or under wet stacking conditions also results in higher emissions. Emissions may include unburned fuel and/or byproducts of incomplete combustion (e.g., carbon dioxide, carbon monoxide, nitrogen oxides, total hydrocarbons, and particulate matter).

In view of the above, it is desirable to operate at high loads near the maximum capacity of a given generator (16). As shown in FIGS. 2A-2B, higher loads enable more complete combustion of the fuel, which improves efficiency by reducing the amount of fuel needed to produce the same amount of energy. In addition, more complete fuel combustion reduces emissions (e.g., carbon monoxide and hydrocarbons, which have more opportunity to complete their chemical reaction into carbon dioxide). Furthermore, parasitic losses make up a smaller portion of the total power when engines are operated at higher loads.

In general, the overall efficiency of the generator (16) improves at higher loads. Ideally, the minimum number of generators (16) are activated near the maximum load capability of the generators (16) to satisfy demand of the drilling rig (11). However, realistically, different types of electrically powered equipment may have different power requirements and the total power requirement of the drilling rig (11) can vary greatly and rapidly depending on which rig operations are active (e.g., drilling, connection periods between pipe lengths, oscillating, tripping/casing operations). For example, some equipment may continuously consume power (e.g., continuous mud pumping), while other equipment consumes power in relatively brief bursts (e.g., hoisting of the drawworks). Furthermore, power requirements during a single type of operation may vary over time. For example, maximum power required for hoisting by the drawworks is higher at the start of a tripping out phase with the total weight of a drill string relative to when the tripping out phase is nearly completed.

In the conventional energy supply system (12), the inability to control generator load independently from demand often results in spending significant time at non-optimal low load conditions where efficiency and emissions are poor. Specifically, because the electrical bus (14) evenly shares the total load from the drilling rig (11) across all generators (16)

that are online, operating an excessive number of generators (16) for a given load will result in low average loads for each individual generator (16).

Furthermore, non-optimal low load conditions are often caused by operator habits. For example, running a minimum number of generators (16) for a given load risks overloading the conventional energy supply system (12). If additional equipment is brought online before an additional generator (16) is synchronized and connected to the electrical bus (14) (i.e., the total load is suddenly increased), one or more generators (16) may disconnect from the electrical bus (14) (e.g., self-protection by opening a breaker) and potentially cause a cascading power failure or complete blackout that can damage equipment and/or significantly delay operations. Therefore, risk-averse operators may activate an excessive number of generators (16) or run generators (16) for longer than needed to avoid costly work stoppages. Similarly, busy operators may simply be too preoccupied with tasks to consistently monitor and maintain generators (16) at optimal operating conditions to reduce emissions.

In general, embodiments of the invention provide a method, a system, and a non-transitory computer readable medium (CRM) for stealth mode operation of a drilling rig to reduce the excessive emissions associated with the poor efficiency of operating generators at low load conditions. As explained in further detail below with respect to FIG. 3, stealth mode operation is implemented on a drilling rig configuration that includes a battery energy management system to manage generators in conjunction with a battery energy storage system.

Figure 3:
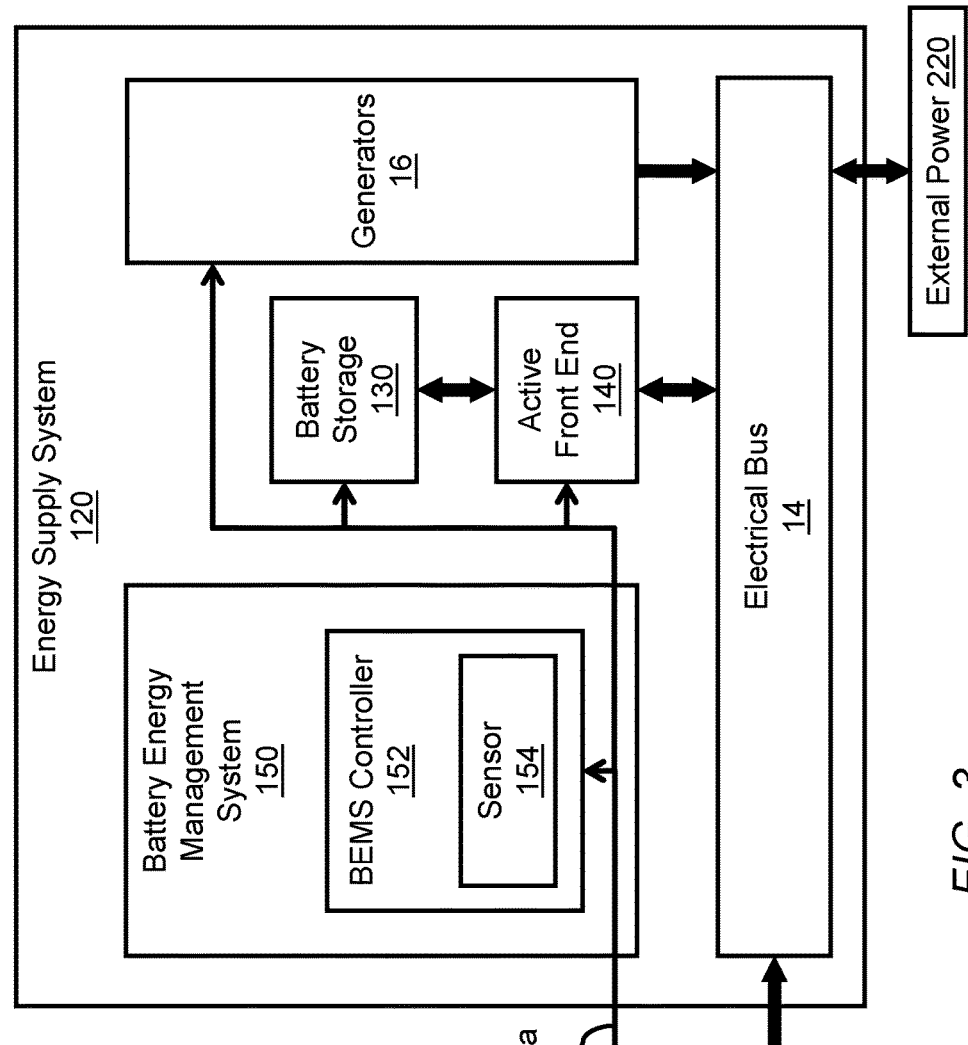
FIG. 3 schematically shows a hybrid drilling rig configuration equipped with an energy supply system, in accordance with one or more embodiments.
Figure 3:
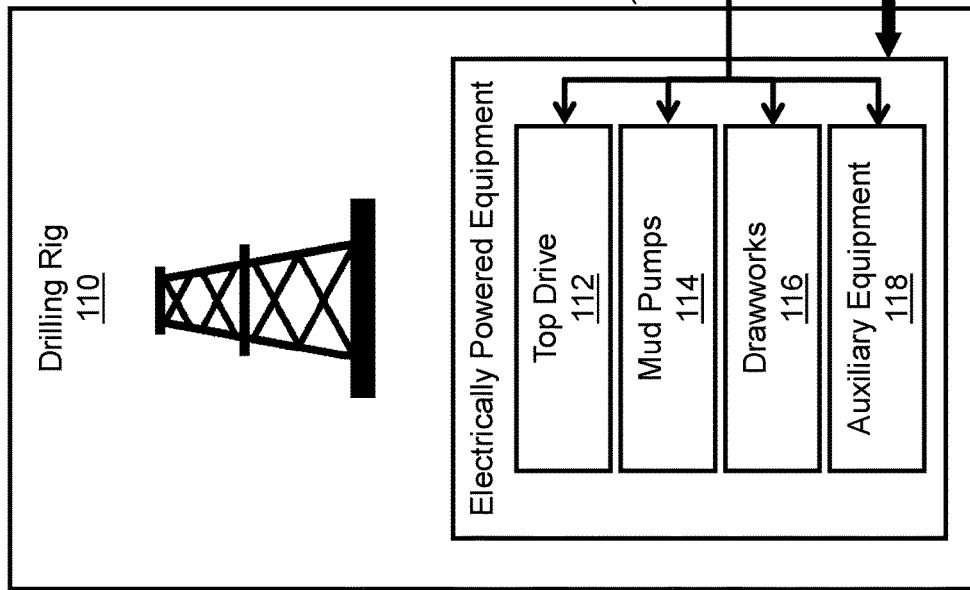

FIG. 3 schematically shows a hybrid drilling rig configuration (100), in accordance with one or more embodiments.

The hybrid drilling rig configuration (100) includes a drilling rig (110), and an energy supply system (120). Each of these components is described in further detail below.

Similar to drilling rig (11), the drilling rig (110) may be any type of drilling rig as it may be used in the oil & gas industries. The drilling rig (110) may include electrically powered equipment such as, for example, a top drive (112) for operating a drill string, one or more mud pumps (114) for pumping of drilling mud, a drawworks (116) for tripping or hoisting pipe, one or more fuel pumps for supplying fuel to generator systems, and/or other auxiliary equipment (118) that generates load demand (e.g., lights, low horsepower motors, etc.).

In one or more embodiments, one or more of the electrically powered equipment (112, 114, 116, 118) installed on the drilling rig (110) may provide data for monitoring activity. For example, the data may include parameters of the equipment (e.g., minimum, maximum, optimal, and/or user defined power levels), real time load information (e.g., streaming time series data), or anticipated load information (e.g., upcoming load estimates, scheduled activation times).

The energy supply system (120) powers the drilling rig (110) with an electrical bus (14). The electrical bus (14) may include a three-phase AC bus with any voltage used by the electrically powered equipment. The electrical bus (14) may further include a DC bus with any voltage used by the electrically powered equipment. Any type of electrical bus may be used, without departing from the disclosure. In the energy supply system (120), in addition to interfacing with one or more generators (16), the electrical bus (14) interfaces with a battery storage (130) via an Active Front End (AFE) (140). In one or more embodiments, the electrical bus (14) may be further configured to interface with an external power supply 220 (e.g., including an additional interface to receive power from or exchange power with a commercial AC grid).

The generator(s) (16) may be of any type, e.g., diesel or natural gas-powered. While FIG. 3 only shows a single generator, any number of generators of any size may be used. For example, a drilling rig (110) may be equipped with three generators (16).

The battery storage (130) includes a plurality of battery cells connected in a network (e.g., a plurality of battery cells may be connected in series as a battery pack to achieve a predetermined output voltage level, a plurality of battery cells or battery packs may be connected in parallel to achieve a predetermined current output current level). The battery storage (130) may be configured with any power ratings (e.g., input/output capacity, lifetime, power storage capacity). The battery storage (130) may be of any type that is suitable for repeated charge/discharge cycles. Lithium-ion batteries or other any other appropriate battery chemistry or battery technology may be used.

The battery storage (130) may include additional subsystems (e.g., a battery management system, one or more programmable logic controllers) to monitor and maintain the individual battery cells (e.g., active protection by performing diagnostics based on temperature, voltage, current monitoring). Furthermore, the battery storage (130) may include one or more passive protections (e.g., fuses, breakers, mechanical protections).

The AFE (140) includes one or more bi-directional power inverters that are configured to charge and discharge the battery storage (130) via the electrical bus (14). The AFE (140) may include any type of AC/DC converter. The AFE (140) may support the electrical bus (14) with reactive power, both capacitive and inductive, to provide full control of the exchange between the battery storage (130) and the electrical bus (14). The AFE (140) may have any power ratings (e.g., input/output capacity, volt-ampere rating, apparent power rating). The AFE (140) may mimic the power rating of a generator (16) to use the same connection to the electrical bus (14). Furthermore, the AFE (140) may be equipped with passive and/or active subsystems to maintain the power inverters (e.g., physical enclosures, liquid cooling systems, environmental controls).

While FIG. 3 only shows a single battery storage (130) and a single AFE (140), any number may be used. In one or more embodiments, an energy supply system (120) on a drilling rig (110) may be equipped with three generators (16) that are supported by one battery storage (130) and one AFE (140). The AFE (140) may have similar power ratings as a generator (16), such that the battery storage (130) and AFE (140) take the place of a generator (16), without significant retrofitting. Furthermore, in one or more embodiments, the entire energy supply system (120) may be interchangeable with a conventional energy supply system (12), which typically includes four generators, without significant retrofitting.

The energy supply system (120) further includes a battery energy management system (BEMS) (150) that manages the generators (16), the battery storage (130), and the AFE (140). In one or more embodiments, the BEMS (150) coordinates the flow of energy between the generators (16), the battery storage (130), and the drilling rig (110) to ensure that power is available as needed by the drilling rig (110).

The BEMS (150) coordinates the flow of energy to manage the energy stored in the battery storage (130). In one or more embodiments, the BEMS (150) may charge the battery storage (130) by connecting to a generator (16) via the AFE (140) and electrical bus (14). The BEMS (150) may launch an additional generator (16) if the capacity of the battery storage (130) drops below a certain threshold and may shut down one or more generators (16) if the battery capacity approaches a full charge.

Furthermore, in one or more embodiments, when demand from the drilling rig (110) is lower than an output capacity of the generator(s) (16), the BEMS (150) may control the AFE (140) to use the remaining power production capacity of the online generator(s) (16) to charge the battery storage (130). In other words, the BEMS (150) can improve efficiency of the online generators (16) by artificially increasing demand on the electrical bus (14) to increase the average load of the online generator(s) (16). By charging the battery storage (130) at a fast rate, the average load of the generators can be increased from a low, non-optimal load to a more efficient load.

In one or more embodiments, the BEMS (150) may discharge the battery storage (130) to provide supplemental power to electrical bus (14). For example, when demand from the drilling rig (110) exceeds the output capacity of the current number of online generators (16), the BEMS (150) may maintain a steady and optimized load on the current number of online generators (16) and control the AFE (140) to provide a variable amount of supplemental power from the battery storage (130) to meet demand.

Furthermore, in one or more embodiments, when the output capacity of the battery storage (130) is sufficient to meet demand, the BEMS (150) may enable the shutdown of one or more generators (16) to increase the load on the remaining online generator(s) (16). Generally, battery energy storage systems require at least one generator online to charge from and maintain voltage and phase of the electrical bus (14) (i.e., battery in grid-following mode). However, one or more embodiments of the present disclosure improve upon this capability by deactivating and disconnecting all generators (16) from the electrical bus (14) and powering the electrical bus (14) exclusively with the battery storage (130) (i.e., battery support a grid-forming mode). This aspect is described in further detail below with respect to FIGS. 4-8.

In order to perform these and other operations, the BEMS (150) includes a BEMS controller (152). The BEMS controller (152) may be implemented in hardware (i.e., circuitry), software, or any combination thereof. The BEMS controller (152) may include a processor or a computer system (e.g., a computer system as described in further detail below with respect to FIG. 9). The computer system may execute instructions for operations based on the flowcharts of FIGS. 4-8.

The BEMS controller (152) may be configured to communicate with the generator(s) (16), the battery storage (130), and the AFE (140) via a network (150a). Furthermore, the BEMS controller (152) may communicate with the drilling rig (110) via the network (150a). The network (150a) may connect to a controller (not shown) on the drilling rig (110) or directly to specific pieces of electrically powered equipment on the drilling rig (110) (e.g., a top drive (112), a mud pump (114), a drawworks (116), and/or a piece of auxiliary equipment (118)). In other words, the BEMS (150) may receive information related to the operations of the drilling rig (110) or the energy supply system (120) (e.g., operational parameters, power demand information, status information, or any other appropriate data) via the network 150a to determine the appropriate instructions and timing for the above described operations of the energy supply system (120).

The network (150a) may be a wired or wireless network (e.g., a local area network (LAN), a wide area network (WAN) such as the Internet, mobile network, or any other type of network) and implemented via one or more network interface connections (e.g., a structural transceiver such as a communication port or antenna) (not shown). The network (150a) may include a variety of communication networks (e.g., CANbus, Modbus, Discrete/Analog inputs) that are integrated with the BEMS controller (152). In one of more embodiments, the BEMS controller (152) may use an Industrial Internet of Things (IIoT) application to access and exchange information from any point of the hybrid drilling rig configuration (100). Data may be streamed online for real-time monitoring by operators and service providers.

In other words, the BEMS controller (152) acts as the central hub of the BEMS (150) and the energy supply system (120). Generally, the BEMS controller (152) is functionally structured as a 2-level system comprising: an upper level that runs machine learning, computes complex optimization strategies, and logs data; and a lower level that enforces operating parameters and executes commands to equipment (e.g., generators (16), battery storage (130), AFE (140)). Examples of parameters used by the BEMS controller (152) are listed in TABLE 1 below. The network (150a) may exchange these parameters, other command information, status information, or any other appropriate data related to the operations of the hybrid drilling rig configuration (100) to and from the BEMS controller (152).

TABLE 1 a. Battery storage (130) and AFE (140)
    i. State of charge
    ii. Temperatures
    iii. AC/DC voltage and currents
    iv. Line power monitoring (real and reactive power, power factor, frequency, AC voltages and currents)
    v. Operating status, alarms, faults
b. Upper level of BEMS controller (152)
    i. Forecast of the power required by the drilling rig (110) compared to energy remaining in the battery storage (130) and performance of the generator(s) (16)
    ii. Start and stop decision monitoring and execution for generator(s) (16)
c. Lower level of BEMS controller (152)
    i. Power quality monitoring and remediation (real and reactive power, power factor, frequency)
    ii. Enforcement of operating parameters
    iii. Communication with controllers (not shown) of generators (16)
        1. AC power values (real and reactive power, power factor, frequency, voltage, current)
        2. Variable frequency drive breaker status for generators (16)
        3. Operating status, alarms, faults
d. Engine control unit (ECU) data
    i. Fuel consumption (diesel and natural gas substitution)
    ii. Engine speed, temperatures, pressures
    iii. Throttle position
    iv. Engine power
    v. Operating status, alarms, faults
e. Flowmeter data
    i. Total diesel flow from fuel tank to generators (16)
    ii. Return diesel flow from generators (16) to fuel tank
    iii. Total natural gas flow to generators (16)

In one or more embodiments, the BEMS controller (152) may include one or more sensors (154) that measure any of the parameters described in TABLE 1. For example, the sensor (154) may include a power meter, voltmeter, ammeter, or any appropriate equipment to determine one or more of the parameters described in TABLE 1. In one or more embodiments, the BEMS controller (152) and/or sensor (154) may be configured to determine a power demand of the drilling rig (110) by monitoring the electrical bus (14).

While FIG. 3 shows various configurations of hardware components and/or software components, other configurations may be used without departing from the scope of the disclosure. For example, the energy supply system (120) may include additional components such as transformers, switchboards, switchgear, etc. Further, various components in FIG. 3 may be combined to create a single component. In addition, the functionality of each component described above may be shared among multiple components or performed by a different component than that described above. In addition, each component may be utilized multiple times (e.g., in serial, in parallel, distributed locally or remotely) to perform the functionality of the claimed invention.

Non-Limiting Examples of an Energy Supply System

In one or more embodiments, the battery storage (130) includes lithium-ion batteries configured with protection and monitoring technology. The battery racks of the battery storage (130) may be packaged in any appropriate facility (e.g., in a climate-controlled building or appropriate container) and set on location next to three diesel generators (16), each configured to provide one megawatt (MW) of power. The AFE (140) includes an AC/DC converter. With approximately 3 MW of power available from the three diesel generators (16) and of the additional discharge capacity available from battery storage (130), an energy supply system (120) according to one or more embodiments may handle the most demanding drilling conditions of a drilling rig (110), while reducing fuel consumption and improving emissions by reducing runtime of the generators (16).

In the following description, the above configuration may be used as a non-limiting example of an energy supply system in accordance with embodiments of the invention to describe some of the basic possible operating modes. Although the following disclosure is described with respect to the above configuration, those skilled in the art, having benefit of this disclosure, will appreciate that various other embodiments may be devised without departing from the scope of the present invention.

EXAMPLE OPERATIONS

The main advantage of an energy supply system (120) comes from delaying the launch of the generators (16) or removing the need to launch additional generators (16). For example, running the generators at sub-optimal loads for extended periods of time can be minimized by controlling the battery storage (130) output to supplement the power production while running few generators (16).

Example 1—Active Drilling Phase

During drilling operations, power demand increases over the course of drilling a well, from about 1 MW up to 3 MW or higher, as the bit travels further from the surface. Using an energy supply system (120) in accordance with embodiments of the disclosure, the BEMS (150) may monitor rig power demand and automatically start and stop generators (16) as needed based on the demand profile and the state of charge of the battery storage (130). When demand is consistently over 2.5 MW during active drilling operations (e.g., top drive rotating and mud pumps set for high pressure output), running all three generators (16) may be required. However, when the three generators become inefficient (i.e., a low average load), the BEMS (150) may disconnect one generator (16) (e.g., deactivate and/or open a breaker) to create a more efficient load on the remaining active and connected generators (16), supported by additional output from the battery storage (130).

Example 2—Tripping and Casing Phases

Tripping and casing operations create surges in power demand from the drawworks (116). However, the surges are intermixed with a low background average power demand (e.g., only 200-500 kW). A conventional rig (10) constantly runs multiple generators (16) to satisfy the peak power demand of the drawworks (116). However, during the low background power demand periods, each generator (16) of the conventional rig (10) would operate at a load only slightly higher than idle, which is extremely inefficient.

With an energy supply system (120) in accordance with embodiments of the disclosure, all tripping and casing operations can be performed using a single generator (16). The BEMS (150) operates one generator (16) and supports the load spikes from the drilling rig (110) with output from the battery storage (130), which can discharge more power than the drawworks (116) is capable of consuming. During low background average power demand (e.g., connection phases), the BEMS (150) runs the single generator (16) at a higher load to satisfy the background average power demand and uses the excess capacity to rapidly recharge the battery storage (130) between each stand.

Improvement to BEMS Operations with Stealth Mode

Embodiments of the invention provide a method, a system, and a non-transitory computer readable medium (CRM) for stealth mode operation of an energy supply system to power a drilling rig. Stealth mode is an operational mode in which the BEMS (150) disconnects all generators (16) from the electrical bus (14) and powers the electrical bus (14) exclusively with the battery storage (130). This is in contrast to conventional battery energy storage systems that require at least one generator online to charge from and to follow the grid of the least one generator (i.e., maintain voltage and phase). Therefore, stealth mode operation in accordance with one or more embodiments of the present disclosure improves the capabilities of an energy supply system by reducing the number of active generators to zero and further reducing the overall runtime of generators on the rig (i.e., reducing fuel consumption and emissions).

Furthermore, the stealth mode operation greatly reduces sound level of the energy supply system (120), improving working conditions for operators on the drilling rig (110).

As explained in further detail below with respect to FIGS. 4-7, stealth mode operation comprises determining periods of non-optimal generator load conditions (e.g., monitoring power demand from the drilling rig (110)) and, based on the determination, deactivating and disconnecting all generators of an energy supply system, and supplying power exclusively from a battery storage system.

Figure 4:
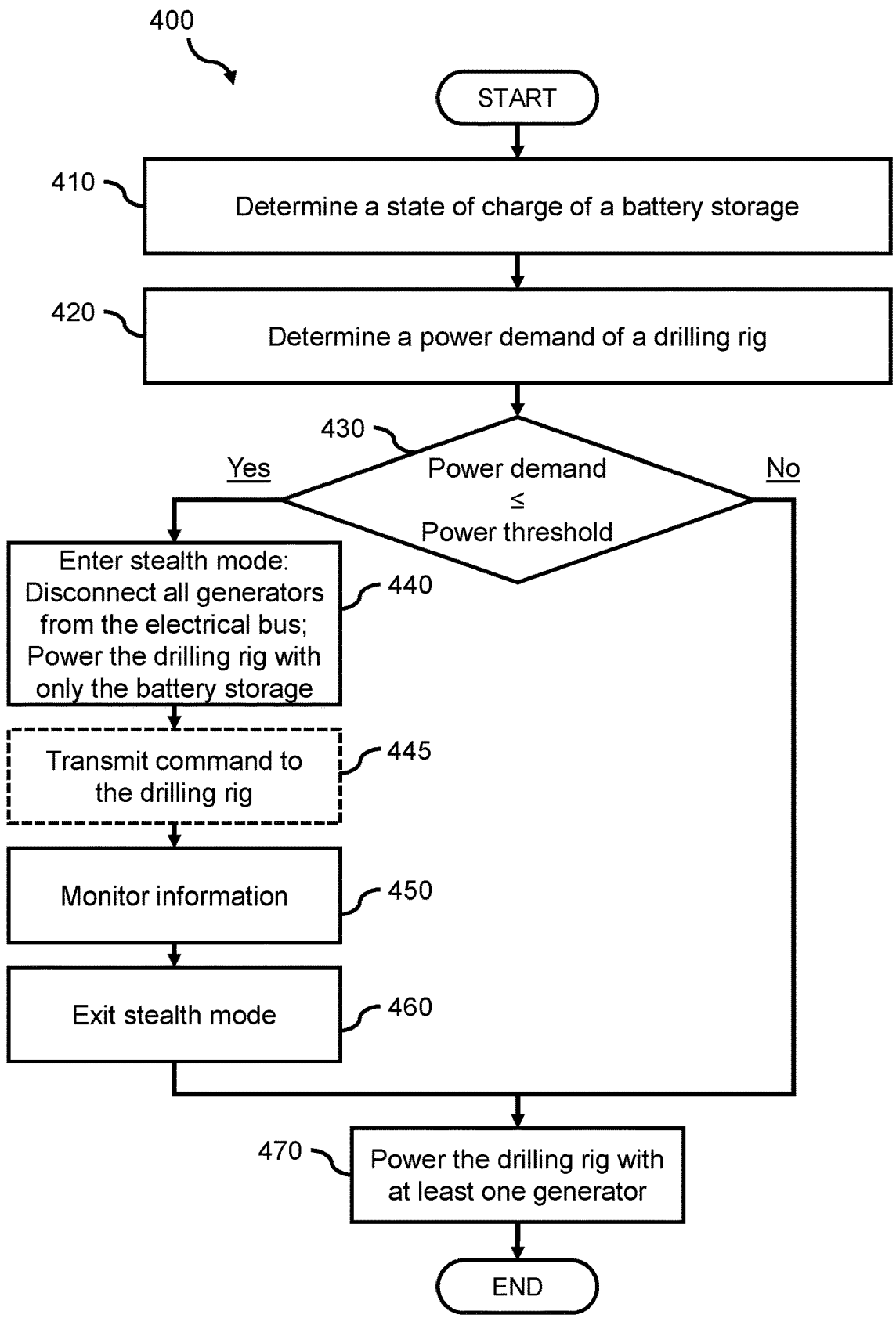
FIG. 4 shows a flowchart of a method for stealth mode operation of an energy supply system to power a drilling rig, according to one or more embodiments.

FIG. 4 shows a flowchart of a method (400) for stealth mode operation of an energy supply system to power a drilling rig, according to one or more embodiments.

At 410, the energy supply system (120) determines a state of charge of the battery storage (130). In one or more embodiments, the battery storage (130) must be above a charged threshold level to enable stealth mode as an option for the energy supply system (120). This process is described in further detail below with respect to FIG. 6.

At 420, the energy supply system (120) determines a power demand of the drilling rig (110). In one or more embodiments, determining the power demand of the drilling rig includes monitoring the electrical bus (14) (e.g., via a power meter, ammeter, and/or voltmeter). The power demand may include an instantaneous power demand of the drilling rig (110) or a power demand over a period of time (i.e., time series data).

In one or more embodiments, the power demand may further include additional information based on any of the parameters described in TABLE 1. In one or more embodiments, determining the power demand of the drilling rig (110) includes obtaining information from the electrically powered equipment on the drilling rig (110). For example, one of the top drive (112), the mud pumps (114), the drawworks (116), and/or the auxiliary equipment (118), and/or any other equipment may send information to the BEMS (150). The information may indicate whether or not a piece of electrically powered equipment on the drilling rig is operating. For example, the information may include time series data of power usage of the equipment. The information may include a flag (e.g., a single bit, a message, a signal) indicating that the equipment has not been operational for a predetermined period or that the equipment has not been operating above a predetermined threshold for a predetermined amount of time.

Alternatively, in one or more embodiments, a central controller (not shown) that coordinates operations of the drilling rig (110) may send the information. For example, the central controller may analyze information from multiple pieces of electrically powered equipment on the drilling rig (110) and send a single piece of information (e.g., the highest power demand, a bit string indicating operational equipment, a single flag indicating stealth mode is to be disabled) to the BEMS (150).

In yet another embodiment, the power demand may be obtained from another source (e.g., an operator, an external network, an equipment schedule). For example, power demand may be determined based on a user manually triggering stealth mode (e.g., manual triggering may be considered as a power demand information that indicates the power demand of the drilling rig (110) is below a predetermined level).

At 430, the energy supply system (120) makes a comparison to determine whether or not the power demand is less than or equal to a battery power threshold. The power threshold may be based on any combination of parameters described in TABLE 1. In one or more embodiments, the power threshold is based on a maximum power output rating of the battery storage (130). For example, the power threshold may be based on the continuous power output rating and/or the intermittent power output rating of the battery storage (130). For example, if the battery power threshold is 35% of the maximum power output capacity of the battery storage (130) and the power demand would only utilize 25% of the maximum power output capacity of the battery storage (130), the energy supply system (120) would determine that the power demand is less than or equal to the power threshold.

In one or more embodiments, in addition to satisfying the numerical comparison of the power demand and battery power threshold, the determination at 430 may further require other prerequisite conditions.

For example, when the power demand includes information from the drilling rig (110), the determination at 430 may further require that a piece of electrically powered equipment on the drilling rig is not operating. In one or more embodiments, when the power demand includes information that a specific piece of equipment (e.g., mud pumps (114), drawworks (116)) on the drilling rig (110) are operating, the determination at 430 may automatically be NO because stealth mode is disabled while the specific piece of equipment (or any flagged equipment) is active. In one or more embodiments, a prerequisite condition may require that the specific piece of electrically powered equipment on the drilling rig is not operating above a predetermined threshold for a predetermined amount of time.

In a non-limiting example, the information from the drilling rig (110) may be any information from the drilling rig (110) that implies a power demand of the drilling rig (e.g., a rig state or operation, a bit depth or hookload, a downhole condition or measurement).

In another example, the determination at 430 may further require that a state of charge of the battery storage is greater than or equal to a charged threshold. In one or more embodiments where the battery storage includes a plurality of battery packs that each include a plurality of batteries connected in series, the determination at 430 may further require that each battery pack of the battery storage has a state of charge above a predetermined threshold.

Examples of this comparison in accordance with one or more embodiments are described in more detail below with respect to FIGS. 5A-5B. Although the comparison at 430 has been described with respect to a limited number of examples above, those skilled in the art, having benefit of this disclosure, will appreciate that various other embodiments may be devised without departing from the scope of the present invention.

When the determination at 430 is YES, the process continues to 440.

At 440, the energy supply system (120) enters a stealth mode by deactivating and disconnecting all generators (16) from the electrical bus (14) and powering the electrical bus (14) and drilling rig (110) with only the battery storage (130). For example, the BEMS (150) may send a command to each of the generators (16) to open a breaker to disconnect from the electrical bus (14) and throttle down. The BEMS (150) may further send a command to the battery storage (130) and AFE (140) to send power to the electrical bus (14) and power the drilling rig (110). In one or more embodiments, the BEMS (150) may control the AFE (140) to seamlessly switch from a grid follow mode (i.e., tracking and synchronizing with the generators (16)) to a grid forming mode (i.e., establishing voltage and frequency parameters for a stable power grid).

In one or more embodiments, the seamless switching from the grid follow mode to a grid forming mode requires critical timing and calibration of the BEMS (150) and/or the BEMS controller (152) to switch between the generators (16) and the battery storage (130) with a timing window (e.g., under 30 milliseconds, under 2 AC cycles). For example, without switching within the critical timing window, interruptions in the power supply can cause breakers to trigger (e.g., in generators (16), in electrically powered equipment on the drilling rig (110)) and may further cause a cascading power failure or complete blackout that can damage equipment and/or significantly delay operations. In other words, in one or more embodiments, the timing window may be result-effective variable in the control of the BEMS (150).

At 445, the energy supply system (120) optionally transmits a command to the drilling rig (110) that limits an operation of an electrically powered equipment. The command may include any combination of parameters described in TABLE 1.

For example, the BEMS (150) may send a command to limit an amount of power or a duration of power supplied to an electrically powered equipment (e.g., a drawworks (116) or a mud pump (114)) during stealth mode operations. In one or more embodiments, the command may limit an operational parameter of the tool (e.g., a maximum ramp rate or a maximum acceleration rate is lowered during stealth mode). In one or more embodiments, the command may change a parameter setpoint (e.g., a ramp rate setpoint, a speed setpoint, an acceleration setpoint, a duration setpoint, a horsepower setpoint) on a certain tool to directly limit an operational parameter of the tool. A setpoint may be a minimum value, a default value, or a maximum value for a given parameter. Therefore, the BEMS (150) may limit the performance of one or more aspects of the drilling rig (110) to ensure that the power demand does not overload the battery storage (130) or drain the battery storage (130) too quickly.

At 450, while in stealth mode, the energy supply system (120) monitors information for determining whether or not an exit condition is satisfied. The process of exiting stealth mode is described in further detail below with respect to FIG. 8.

At 460, the energy supply system (120) exits the stealth mode by activating and connecting at least one generator (16) to the electrical bus (14). For example, the BEMS (150) may send a command to one, a plurality, or all of the generators (16) to power on, close their breaker(s), and reconnect to the electrical bus (14). In one or more embodiments, the BEMS (150) may control the AFE (140) to seamlessly switch from a grid forming mode to a grid follow mode (i.e., tracking and synchronizing with the newly connected generator(s) (16)).

When the determination at 430 is NO, the process continues to 470.

At 470, the energy supply system (120) powers the drilling rig (110) with at least the one generator (16).

If the stealth mode was activated during the execution of method (400), overall emissions from the drilling rig (110) and total fuel consumed by the drilling rig (110) are reduced by the lack of any generators (16) operating during the stealth mode phase.

Figure 5A:
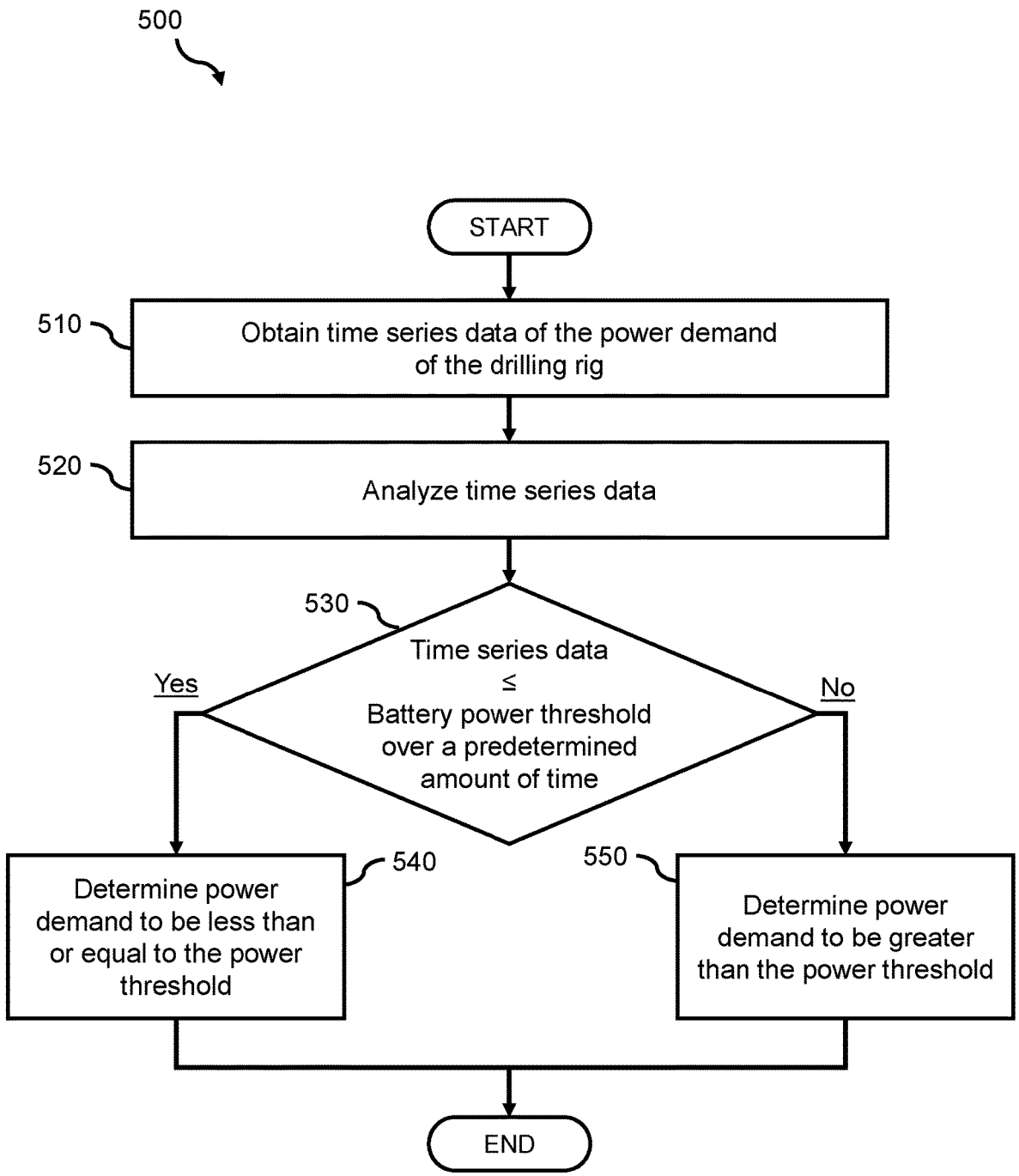
FIGS. 5A-5B show flowcharts of methods for starting a stealth mode operation, according to one or more embodiments.

FIG. 5A shows a flowchart of a method (500) for starting a stealth mode operation based on time series data, according to one or more embodiments.

At 510, the energy supply system (120) obtains time series data of the power demand of the drilling rig (110). For example, one of the top drive (112), the mud pumps (114), the drawworks (116), and/or the auxiliary equipment (118), and/or any other equipment (e.g., a central controller of the drilling rig (110)) may send historical power demand information (e.g., load levels, operational parameters) to the BEMS (150) (e.g., streaming data, intermittent data logs).

At 520, the energy supply system (120) analyzes time series data. For example, the energy supply system (120) may filter (e.g., crop, sort, filter, smooth, decimate, refine) the time series data to identify trends in the power levels of the energy supply system (120).

At 530, the energy supply system (120) makes a comparison to determine whether or not the time series data is less than or equal to the battery power threshold over a predetermined amount of time. The predetermined amount of time may be based on any of the parameters described in TABLE 1. For example, when the battery power threshold is 35% of the maximum continuous output rating of the battery storage (130), the predetermined amount of time may be equal to 30 minutes. When the battery power threshold is 25% of the maximum continuous output rating of the battery storage (130), the predetermined amount of time may be equal to 20 minutes.

In one or more embodiments, the determination at 530 includes a comparison of the time series data to multiple thresholds. For example, the multiple thresholds may include a first power threshold (e.g., 35% of the maximum continuous output rating of the battery storage (130)) and a second power threshold (e.g., 25% of the maximum continuous output rating of the battery storage (130)) that is lower than the first power threshold. Thus, the power demand may be determined to be less than or equal to the battery power threshold when a first condition or a second condition is satisfied. The first condition may require that the time series data is less than or equal to the first power threshold over a first time duration (e.g., 30 minutes). The second condition may require that the time series data is less than or equal to the second threshold over a second time duration (e.g., 20 minutes) that is shorter than the first time duration. Conversely, the power demand is determined to be greater than the battery power threshold when the time series data fails to satisfy the first condition or the second condition (2), or when the time series data exceeds the battery power threshold at any point.

When the determination at 530 is YES, the process continues to 540.

At 540, the energy supply system (120) determines that power demand is less than or equal to the power threshold.

When the determination at 530 is NO, the process continues to 550.

At 550, the energy supply system (120) determines that power demand is greater than to the power threshold.

Figure 5B:
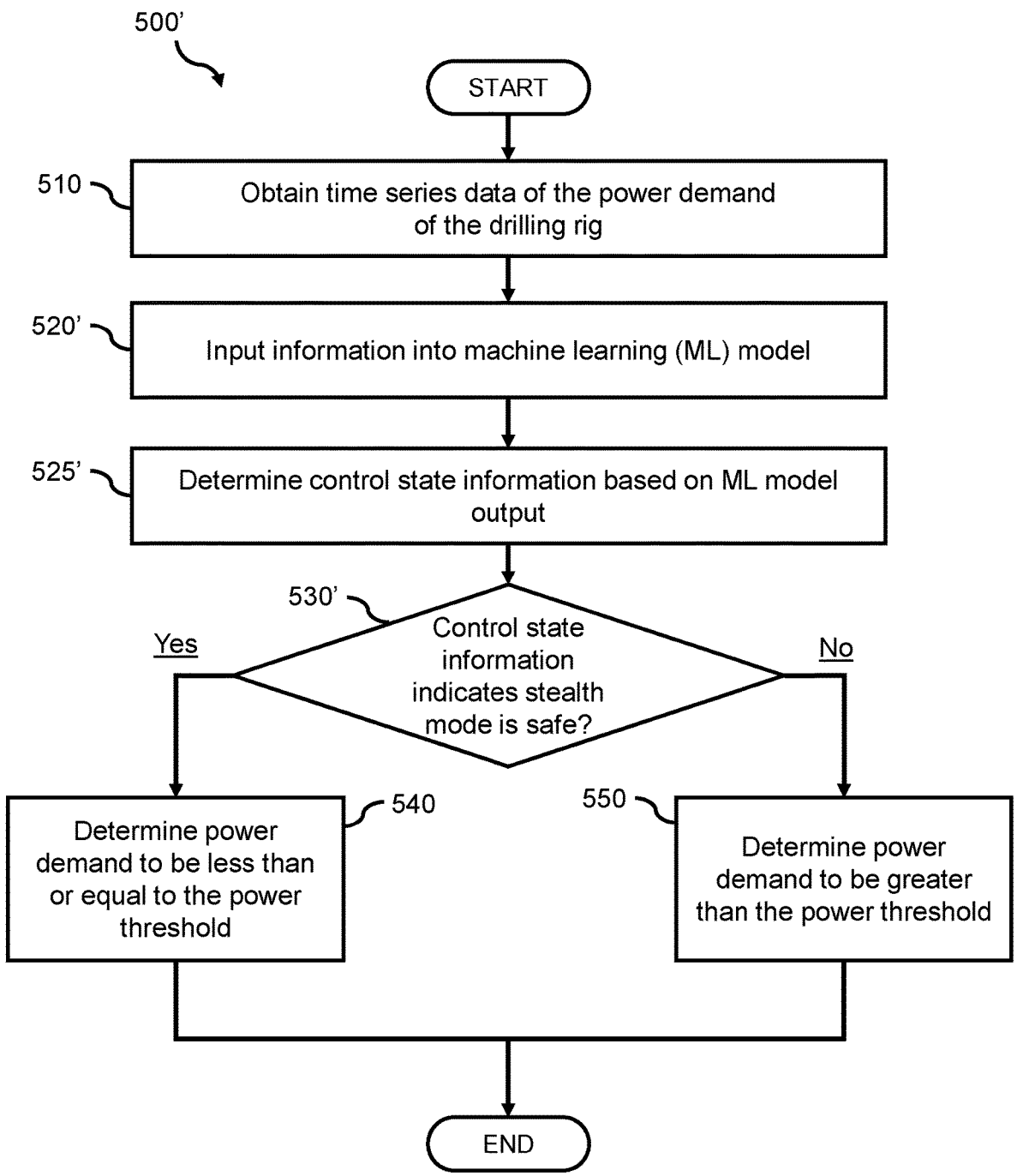

FIG. 5B show a flowchart of an alternative method (500') for starting a stealth mode operation based on machine learning, according to one or more embodiments.

At 510, similar to the method (500), the energy supply system (120) obtains time series data of the power demand of the drilling rig (110) (e.g., from electrically powered equipment on the drilling rig (110), from a central controller (not shown), from monitoring the electrical bus (14), from another source). The time series data may include numerical power demand data and additional operational information (e.g., any of the parameters described in TABLE 1).

At 520', the energy supply system (120) inputs information (i.e., the time series data and any additional operational information) into a machine learning (ML) model that is trained to determine a control state information. For example, one or more ML algorithms (e.g., deep learning neural network) are used to train the ML model to accept information and output control state information. The ML model may be trained using real, synthetic, and/or augmented (e.g., curated or supplemented) data.

At 525', the energy supply system (120) determines the control state information based on the ML model and the input load information. The control state information output by the ML model may indicate an operational status of the drilling rig (110) (e.g., indicating what type of operation is being performed by the drilling rig (110)) or a power status of the drilling rig (110) (e.g., indicating a power level, a power range, a predicted power behavior).

At 530', the energy supply system (120) makes a comparison to determine whether or not the control state information indicates that switching to stealth mode is safe.

In one or more embodiments where the ML model is configured to output a type of operation being performed by the drilling rig (110) (e.g., tripping out, drilling, maintenance, idle), the operations may be grouped into two categories. Operations that are too power intensive to perform using only the battery storage (130) may be grouped into a first category that indicates stealth mode is not safe. Operations that can be performed using only the battery storage (130) may be included in a second category that indicates stealth mode is safe.

In one or more embodiments where the ML model is configured to output a power status, the comparison at 530' may be a direct comparison to a battery power threshold or a power range that is safe for stealth mode operation.

When the determination at 530' is YES, the process continues to 540 as described above.

When the determination at 530' is NO, the process continues to 550 as described above.

Figure 6:
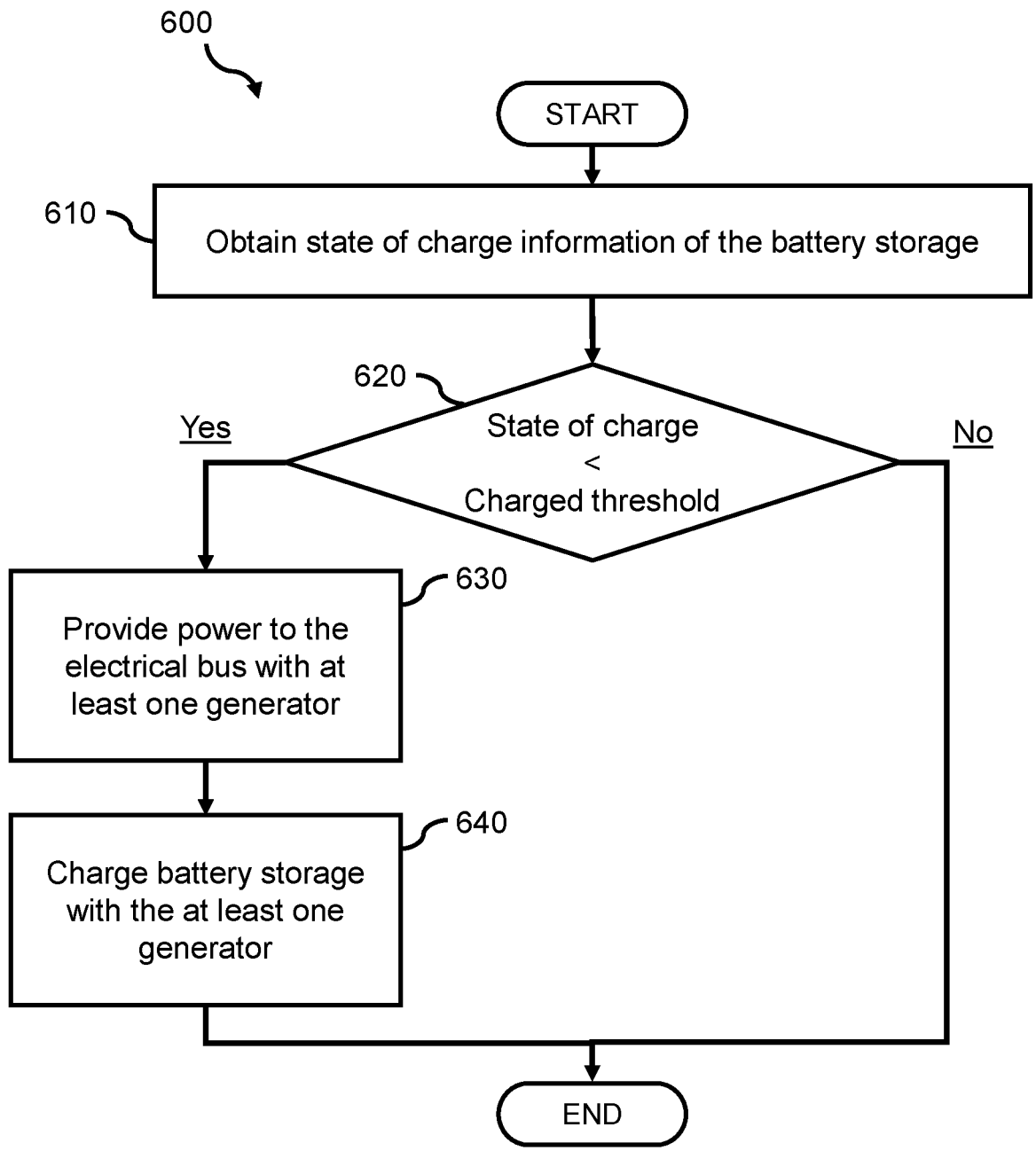
FIG. 6 shows a flowchart of a method for preparing a stealth mode operation, according to one or more embodiments.

FIG. 6 shows a flowchart of a method (600) for preparing a stealth mode operation, according to one or more embodiments.

At 610, the energy supply system (120) obtains state of charge information of the battery storage (130). In one or more embodiments, the BEMS (150) may communicate with a battery management system or one or more programmable logic controllers that monitor the charge level of the battery storage (130).

At 620, the energy supply system (120) makes a comparison to determine whether or not the state of charge of the battery storage (130) is less than a charged threshold. The charged threshold may be based on any combination of parameters described in TABLE 1.

In one or more embodiments, the charged threshold may be any preprogrammed threshold value (e.g., a percentage of the capacity of the battery storage (130), an amount of kW.hrs, or any appropriate measure). For example, the charged threshold may be 100% to require that the battery storage (130) is charged to its maximum possible capacity before switching to stealth mode is available. Alternatively, the charged threshold may be a fixed value less than 100% of the capacity of the battery storage (130) to prevent the batteries from overcharging.

In one or more embodiments, the charged threshold may be a dynamic value (e.g., based on an operational state of the drilling rig (110), manually controlled by an operator). For example, repairing a complex piece of equipment on the drilling rig (110) may require higher a higher charged threshold value to ensure stealth mode could be maintained for the long duration of the repair.

In one or more embodiments where the battery storage (130) includes a plurality of battery packs that each include a plurality of batteries connected in series, the charge threshold may include a predetermined threshold for the battery packs. In other words, the battery storage (130) may be considered safe for stealth mode when each battery pack has a state of charge greater than or equal to a predetermined threshold. In one or more embodiments, each battery pack must have a state of charge that is within a predetermined range (e.g., difference between the highest and lowest packs is less than a predetermined number of percentage points).

When the determination at 620 is YES, the process continues to 630

At 630, the energy supply system (120) provides power to the electrical bus (14) with at least one generator (16) (e.g., activate, synchronize, and connect the generator (16) to the electrical bus (14)).

At 640, the energy supply system (120) uses the connected generator (16) to simultaneously power the drilling rig (110) and charge the battery storage (130) until the charged threshold is reached. Once the charged threshold is reached, the process ends because the system is ready to switch to stealth mode (e.g., proceed with comparing the power demand to the power threshold at 420).

When the determination at 620 is NO, the process ends because the system is ready to switch to stealth mode.

Figure 7:
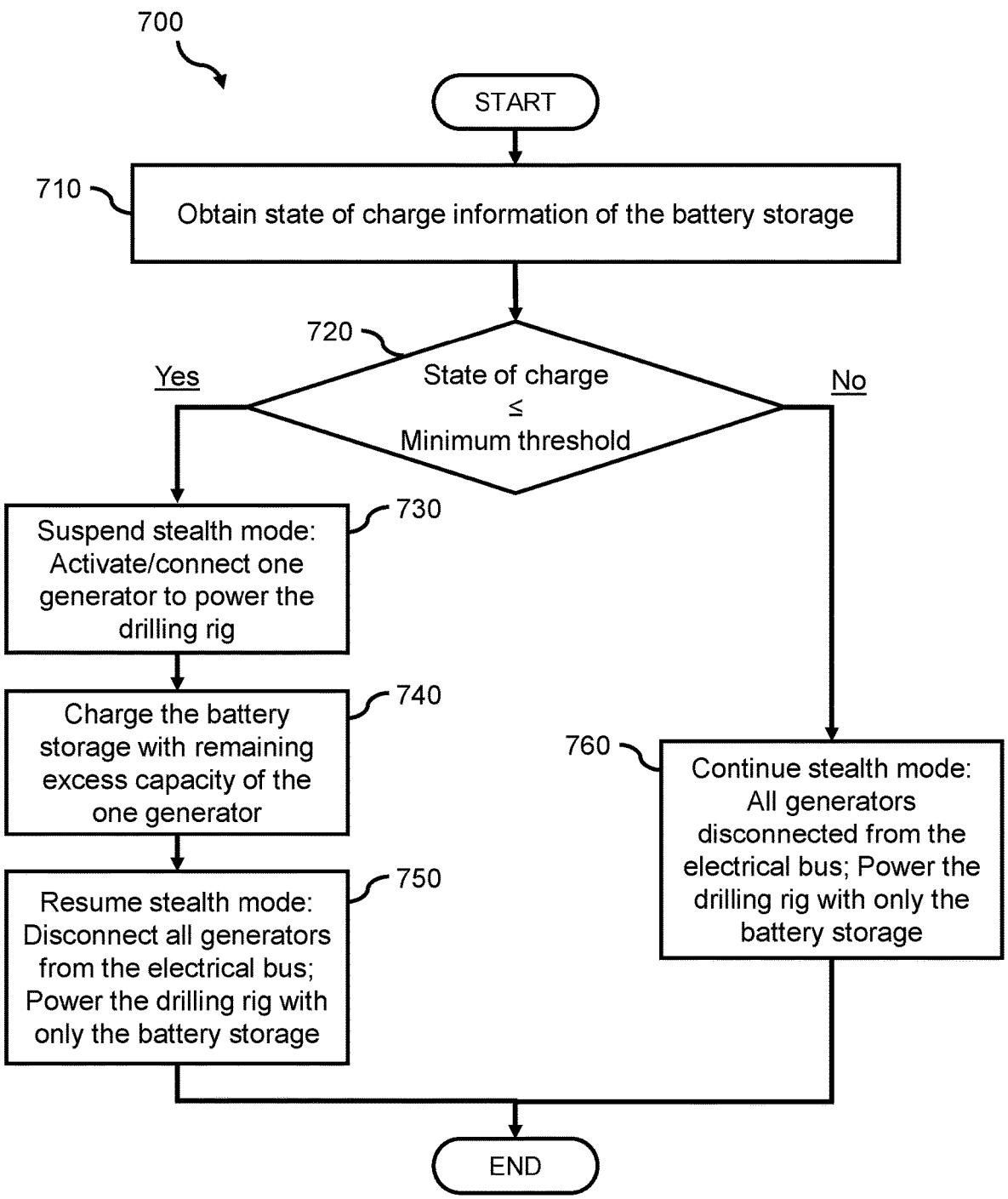
FIG. 7 shows a flowchart of a method for maintaining a stealth mode operation, according to one or more embodiments.

FIG. 7 shows a flowchart of a method (700) for maintaining a stealth mode operation, according to one or more embodiments.

At 710, similar to 610, the energy supply system (120) obtains state of charge information of the battery storage (130). During operation of the stealth mode, obtaining the state of charge may be performed at regular intervals, irregular intervals, on-demand, or at any given time.

At 720, the energy supply system (120) makes a comparison to determine whether or not the state of charge of the battery storage (130) is less than or equal to a minimum threshold. The minimum threshold may be based on any combination of parameters described in TABLE 1.

In one or more embodiments, the minimum threshold may be any preprogrammed threshold value (e.g., a percentage of the capacity of the battery storage (130), an amount of kW.hrs, or any appropriate measure). In one or more embodiments, the minimum threshold may be a dynamic value (e.g., based on an operational state of the drilling rig (110), manually controlled by an operator).

When the determination at 720 is YES, the process continues to 730.

At 730, the energy supply system (120) suspends stealth mode by providing power to the electrical bus (14) with at least one generator (16) (e.g., activate, synchronize, and connect the generator (16) to the electrical bus (14)).

At 740, the energy supply system (120) uses the connected generator (16) to simultaneously power the drilling rig (110) and charge the battery storage (130) with remaining capacity of the one generator (16). For example, the generator (16) may be launched above a predetermined efficiency level (e.g., at full capacity to ensure high efficiency operation with low emissions). Even though the power demand of the drilling rig (110) is not enough to use the full power production capacity of the generator (16), any remaining power production capacity is used to rapidly recharge the battery storage (130). Charging may continue for any amount of time or until the charged threshold is reached.

At 750, the energy supply system (120) resumes stealth mode by deactivating and disconnecting all generators (16) from the electrical bus (14) and powering the drilling rig (110) with only the battery storage (130). The process may return to 710 to continue monitoring during stealth mode or end when stealth mode is exited.

When the determination at 720 is NO, the process continues to 760.

At 760, the energy supply system (120) continues stealth mode. All generators (16) remain disconnected from the electrical bus (14) and only the battery storage (130) provides power to the electrical bus (14) and the drilling rig (110). The process may return to 710 to continue monitoring during stealth mode or end when stealth mode is exited.

Figure 8:
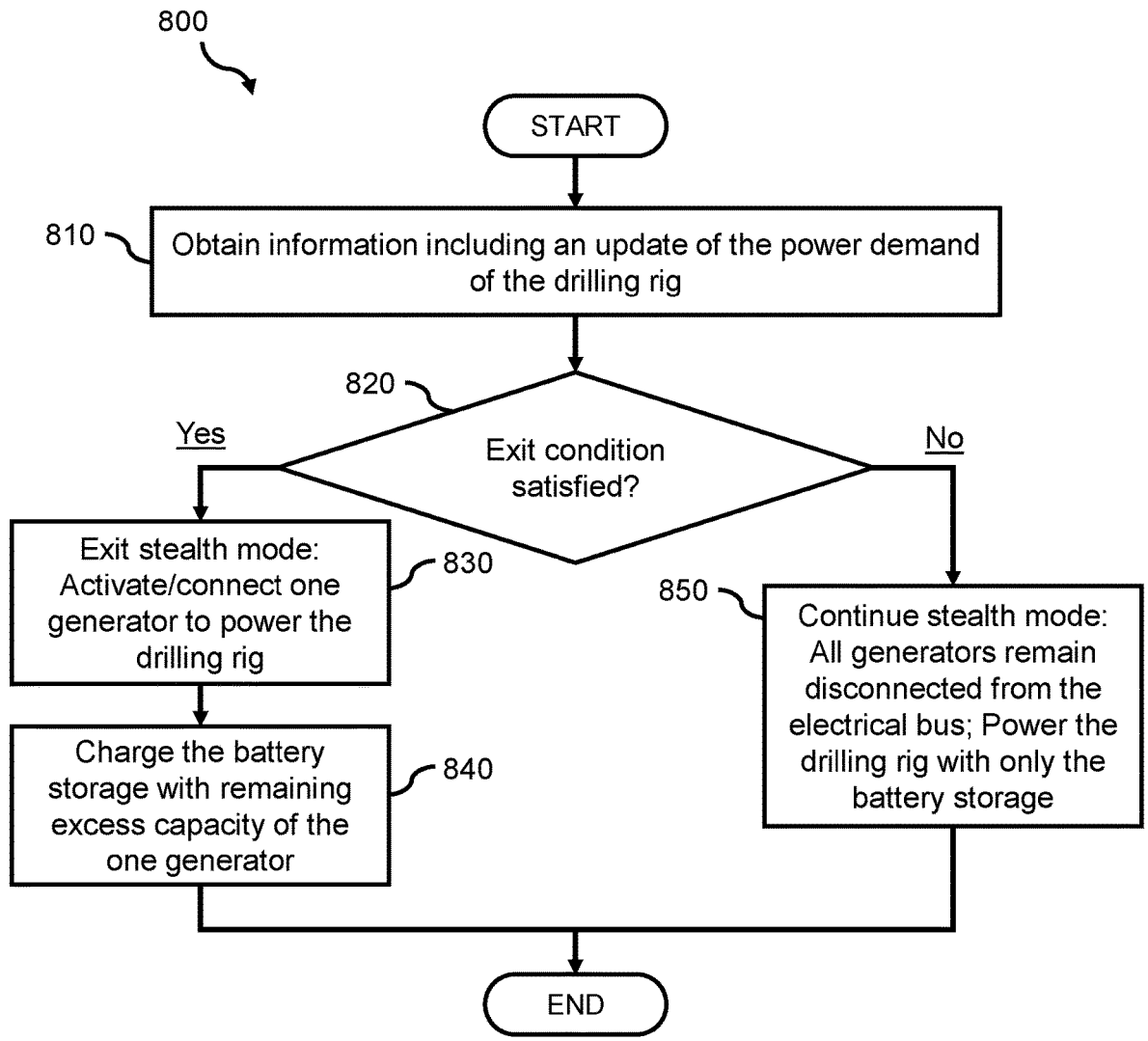
FIG. 8 shows a flowchart of a method for exiting a stealth mode operation, according to one or more embodiments.

FIG. 8 shows a flowchart of a method (800) for exiting a stealth mode operation, according to one or more embodiments.

At 810, the energy supply system (120) obtains information for determining whether or not an exit condition is satisfied. The information may be obtained by monitoring the electrical bus (14), the battery storage (130), the drilling rig (110) and/or any appropriate source (e.g., an operator, an external network, an equipment schedule).

In one or more embodiments, the information includes an update of the power demand of the drilling rig (110) based on monitoring the electrical bus (14). The change of the power demand may be caused by a change in the operational state of the drilling rig (110) (e.g., switching from an idle state to an active operation, switching from low load phase to a high load phase of a single operation (such as hoisting vs. lowering pipe sections during tripping out phase)). The update may be immediate increase in power demand or a predicted increase in power demand (e.g., scheduled event, recurring event with known period (such as hoisting sections of pipe)).

In one or more embodiments, the information further includes a state of charge of the battery storage (130).

In one or more embodiments, the information further includes one or more of the parameters described in TABLE 1. For example, the information may include operational information (e.g., load levels, operational parameters, time series data, one or more flags) from the electrically powered equipment (or a central controller) on the drilling rig (110). In yet another embodiment, the information may include a manual command from an operator (e.g., a command to exit stealth mode), an alert from the BEMS (150) or drilling rig (110).

At 820, the energy supply system (120) determines, based on the information, whether or not the exit condition is satisfied.

In one or more embodiments where the information includes an update of the power demand of the drilling rig (110), the exit condition may require that the power demand is greater than an exit threshold. The exit threshold may be based on any combination of parameters described in TABLE 1. In one or more embodiments, the exit threshold may be any preprogrammed threshold value (e.g., a percentage of the capacity of the battery storage (130), an amount of kW.hrs, or any appropriate measure). In one or more embodiments, the exit threshold may be a dynamic value (e.g., based on an operational state of the drilling rig (110), manually controlled by an operator).

In one or more embodiments, the exit threshold is based on a maximum power output rating of the battery storage (130). For example, the exit threshold may be based on the continuous power output rating and/or the intermittent power output rating of the battery storage (130). For example, if the exit threshold is 50% of the continuous maximum power output capacity of the battery storage (130) and the power demand would utilize 65% of the continuous maximum power output capacity of the battery storage (130), the energy supply system (120) would determine that the exit condition is satisfied. In one or more embodiments, the exit condition may require that the power demand exceed the exit threshold for a predetermined amount of time.

In one or more embodiments where the information includes time series data of the power demand of the drilling rig (110), the exit condition may include a comparison of the time series data to multiple thresholds (e.g., two or more thresholds that may or may not correspond to respective time durations). For example, the multiple thresholds may include a first exit threshold (e.g., 75% of the maximum continuous output rating of the battery storage (130)) and a second exit threshold (e.g., 85% of the maximum continuous output rating of the battery storage (130)) that is greater than the first power threshold. Thus, the exit condition may be satisfied when a first condition or a second condition is satisfied. The first condition may require that the time series data is greater than the first power threshold over a first time duration (e.g., 5 minutes). The second condition may require that the time series data is greater than the second threshold over a second time duration (e.g., 5 seconds) that is shorter than the first time duration. Conversely, the exit condition is not satisfied when the time series data fails to satisfy both the first condition and the second condition.

In a non-limiting example, there may be three or more monotonically increasing exit thresholds that correspond to three or more monotonically decreasing time durations.

In one or more embodiments where the information includes operational information from the drilling rig (110), the exit condition may be immediately satisfied when the operational information indicates a predetermined piece of electrically powered equipment on the drilling rig is operating (e.g., stealth mode is exited while the specific piece of equipment (e.g., mud pumps (114), drawworks (116)) is activated). Alternatively, the exit condition may require that the predetermined piece of electrically powered equipment on the drilling rig is operating above a predetermined threshold (e.g., a drawworks operating above a predetermined speed or horsepower threshold, mud pumps operating above a speed setpoint).

In a non-limiting example, the exit condition is triggered by mud pumps (114) operating at a speed greater than zero or the drawworks operating above an operational threshold (e.g., a power demand threshold, a speed threshold).

In another non-limiting example, the exit condition may be based on any information from the drilling rig (110) that implies a power demand of the drilling rig (e.g., a rig state or operation, a bit depth or hookload, a downhole condition or measurement).

In one or more embodiments where the information includes a state of charge of the battery storage (130), the exit condition may require that the state of charge of the battery storage (130) is less than or equal to a minimum threshold. In one or more embodiments where the battery storage (130) includes a plurality of battery packs that each include a plurality of batteries connected in series, exit condition may require that a state of charge of the lowest battery pack is less than or equal to a minimum pack threshold (e.g., 50% of maximum capacity).

In one or more embodiments, the exit condition may be immediately satisfied, regardless of other information, when certain critical conditions are met. For example, a manual command from an operator triggering may immediately satisfy the exit condition. Alternatively, information from an alert system (e.g., BEMS (150) indicating a loss of communication in any part of the network (150a), an alert in one or more components of the energy supply system (120) or the drilling rig (110)) may immediately satisfy the exit condition.

In one or more embodiments, the exit condition may require that at least one generator (16) is available to be launched (i.e., in condition to activated, synchronized, and connected to the electrical bus (14)).

Although the exit condition has been described with respect to a limited number of examples above, those skilled in the art, having benefit of this disclosure, will appreciate that various other embodiments may be devised without departing from the scope of the present invention.

When the determination at 820 is YES, the process continues to 830

At 830, the energy supply system (120) exits stealth mode by providing power to the electrical bus (14) with at least one generator (16) (e.g., activate, synchronize, and connect the generator (16) to the electrical bus (14)).

At 840, the energy supply system (120) uses the connected generator (16) to simultaneously power the drilling rig (110) and charge the battery storage (130) with remaining capacity of the one generator (16). For example, the generator (16) may be launched above a predetermined efficiency level (e.g., at full capacity to ensure high efficiency operation with low emissions). Even though the power demand of the drilling rig (110) is not enough to use the full power production capacity of the generator (16), any remaining power production capacity is used to rapidly recharge the battery storage (130). The process ends and overall emissions from the drilling rig (110) are reduced by the lack of any generators (16) operating during the stealth mode phase. The drilling rig (110) continues operations powered by any combination of generator(s) (16) and the battery storage (130).

When the determination at 820 is NO, the process continues to 850.

At 850, the energy supply system (120) continues stealth mode. All generators (16) remain disconnected from the electrical bus (14) and only the battery storage (130) provides power to the drilling rig (110). The process may return to 810 to continue monitoring for the exit condition to be satisfied.

While the various steps in FIGS. 4-8 are presented and described sequentially, one of ordinary skill in the art will appreciate that some or all of the blocks may be executed in different orders, may be combined, or omitted, and some or all of the blocks may be executed in parallel. Furthermore, the blocks may be performed actively or passively. The methods of FIGS. 4-8 may be implemented using instructions stored on a non-transitory medium that may be executed by a computer system, as discussed in further detail below with respect to FIG. 9.

The following examples of stealth mode operation are non-limiting examples in accordance with embodiments of the invention. Although the following stealth mode examples are described with respect to specific operational phases of a drilling rig, those skilled in the art, having benefit of this disclosure, will appreciate that various other implementations (e.g., use of stealth mode during other operational phases) may be devised without departing from the scope of the present invention.

Stealth Mode Example 1—Completion of Drilling Phase

When drilling is complete, rig operators may wait several hours or longer to shut down generators (16) that are no longer needed to power operations. In the energy supply system (120), the BEMS (150) may receive load information from the drilling rig (110) (e.g., at least one of the top drive (112) and the mud pumps (114)) via the network (150*b*). The load information may indicate a period of low demand due to the inactivity of electrically powered equipment on the drilling rig (110). In one or more embodiments, when the period of inactivity exceed a predetermined time threshold, the BEMS (150) may seamlessly switch from the generator(s) (16) to exclusively power the electrical bus (14) via the battery storage (130). For example, the energy supply system (120) may automatically shut down generators (16) within 10-20 minutes after determining they are not needed from the load demand profile of the drilling rig (110).

Stealth Mode Example 2—Maintenance Phase

When a drilling rig (110) takes a short break for maintenance (e.g., scheduled daily maintenance, equipment repair, generator repair), the BEMS (150) may exclusively power the electrical bus (14) via the battery storage (130) during the period of low demand. For example, the drilling rig (110) (e.g., a controller or equipment on the drilling rig (110)) may send schedule information of the maintenance period (e.g., a schedule, a time duration, a timer, a status flag) to inform the BEMS (150) of the maintenance. In one or more embodiments, the schedule information may be included in a power demand or load information reported from the drilling rig (110). Alternatively, the BEMS (150) may detect the maintenance period by monitoring a load information of the electrically powered equipment on the drilling rig (110).

Figure 9:
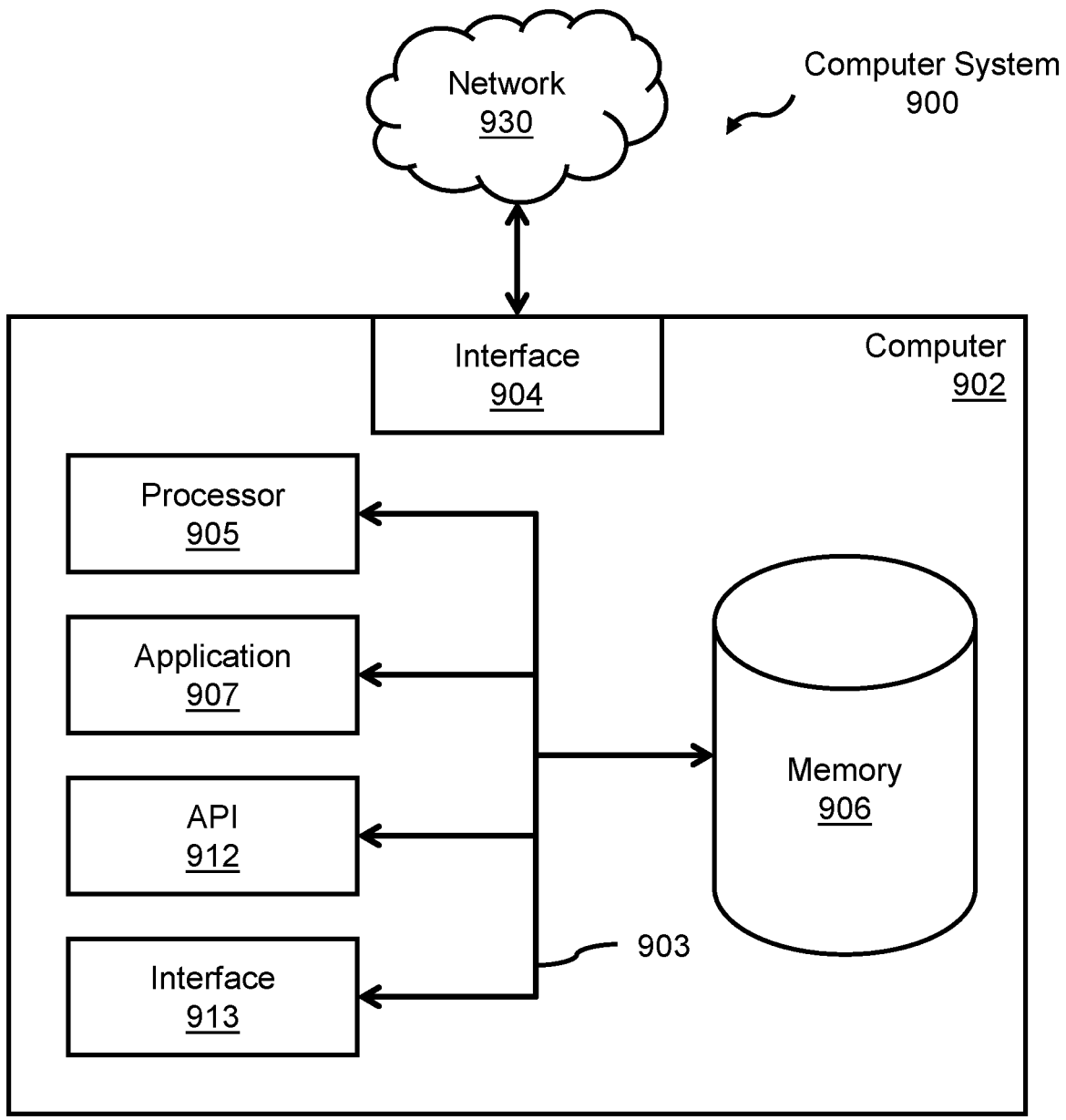
FIG. 9 shows a computer system, in accordance with one or more embodiments.

FIG. 9 shows a computing system, according to one or more embodiments. Embodiments may be implemented on a computer system. FIG. 9 is a block diagram of a computer system (902) used to provide computational functionalities associated with described algorithms, methods, functions, processes, flows, and procedures as described in the instant disclosure, according to an implementation. The illustrated computer (902) is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or other suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), each computer (902) communicating over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

In some embodiments, the computer (902) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

One or more of the embodiments of the disclosure may have one or more of the following advantages: reduction in fuel consumption; reduction in overall emissions from generators; reduction of wet stacking and subsequent improvement to generator efficiency and lifespan; reduction in noise levels; improvement to the technical field of energy supply systems by enabling a battery storage to power a system without any online generators.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of operating a drilling rig, that includes electrically powered equipment, and an energy supply system, that includes a battery storage, one or more generators, and an electrical bus that powers the drilling rig, the method comprising:
   determining, by the energy supply system, a power demand of the drilling rig;

comparing the power demand to a battery power threshold, wherein the battery power threshold is associated with a maximum continuous power output of the energy supply system at a given time;

when the power demand is less than or equal to the battery power threshold, the energy supply system enters a stealth mode by deactivating and disconnecting all generators from the electrical bus and powering the electrical bus and the drilling rig with only the battery storage; and when the power demand is greater than the battery power threshold, the energy supply system powers the electrical bus with at least one of the one or more generators, wherein the battery power threshold is based on a maximum power output rating of the battery storage.

2. The method of claim 1, wherein determining the power demand of the drilling rig includes obtaining time series data, wherein comparing the power demand to the battery power threshold includes a comparison of the time series data to a first power threshold and a second power threshold that is lower than the first power threshold, wherein the power demand is determined to be less than or equal to the battery power threshold when condition (1) or condition (2) is satisfied:
 (1) the time series data is less than or equal to the first power threshold over a first time duration;
 (2) the time series data is less than or equal to the second power threshold over a second time duration that is shorter than the first time duration, and wherein the power demand is determined to be greater than the battery power threshold when:
 the time series data fails to satisfy condition (1) or condition (2); or
 the time series data exceeds the battery power threshold at any point.

3. The method of claim 1, wherein determining the power demand of the drilling rig further includes obtaining information from the drilling rig, wherein the information indicates whether or not a piece of electrically powered equipment on the drilling rig is operating, wherein, in addition to comparing the power demand to the battery power threshold, entering stealth mode further requires that the piece of electrically powered equipment on the drilling rig is not operating above a predetermined threshold for a predetermined amount of time.

4. The method of claim 1, wherein, before comparing the power demand to the battery power threshold, the energy supply system determines a state of charge of the battery storage, wherein when the state of charge of the battery storage is less than a charged threshold, the energy supply system connects at least one of the one or more generators to the electrical bus to power the drilling rig and to charge the battery storage until the charged threshold is reached, wherein when the state of charge of the battery storage is greater than or equal to the charged threshold, the method proceeds with comparing the power demand to the battery power threshold, and wherein, in addition to comparing the power demand to the battery power threshold, entering stealth mode further requires that the state of charge of the battery storage is greater than or equal to the charged threshold.

5. The method of claim 4, wherein the battery storage includes a plurality of battery packs that each include a plurality of batteries connected in series, and wherein entering stealth mode further requires that each battery pack of the battery storage has a state of charge greater than or equal to a predetermined threshold.

6. The method of claim 1, wherein, while in the stealth mode, the energy supply system monitors information that includes an update of the power demand of the drilling rig, and wherein when the information satisfies an exit condition, the energy supply system exits the stealth mode by:
 activating and increasing a load of one of the one or more generators above a predetermined efficiency threshold; and
 connecting the one of the one or more generators to the electrical bus to power the drilling rig and charge the battery storage.

7. The method of claim 6, wherein the information includes operational information from the drilling rig, and wherein the exit condition is immediately satisfied when the operational information indicates a predetermined piece of electrically powered equipment on the drilling rig is operating above a predetermined threshold.

8. The method of claim 6, wherein the information includes time series data of the power demand of the drilling rig, wherein the exit condition includes a comparison of the time series data to:
 a first exit threshold that is based on the maximum power output rating of the battery storage; and
 a second exit threshold that is greater than the first exit threshold;

wherein the exit condition is satisfied when condition (1) or condition (2) is satisfied:
 (1) the time series data is greater than the first exit threshold over a first time duration;
 (2) the time series data is greater than the second exit threshold over a second time duration that is shorter than the first time duration, and wherein the exit condition is not satisfied when the time series data fails to satisfy both condition (1) and condition (2).

9. The method of claim 1, wherein, when entering the stealth mode, the energy supply system transmits a command to the drilling rig that limits operation of a drawworks, a mud pump, or a top drive.

10. An energy supply system for operating a drilling rig that includes electrically powered equipment, the energy supply system comprising:
 an electrical bus that powers the drilling rig;
 a battery storage that is configured to draw power from and supply power to the electrical bus;
 one or more generators that are configured to supply power to the electrical bus; and
 a computer system that:
  determines a power demand of the drilling rig;
  compares the power demand to a battery power threshold, wherein the battery power threshold is associated with a maximum continuous power output of the energy supply system at a given time;

when the power demand is less than or equal to the battery power threshold, the computer system commands the energy supply system to enter a stealth mode by deactivating and disconnecting all generators from the electrical bus and powering the electrical bus and the drilling rig with only the battery storage; and when the power demand is greater than the battery power threshold, the computer system commands the energy supply system to power the electrical bus with at least one of the one or more generators, wherein the battery power threshold is based on a maximum power output rating of the battery storage.

11. The energy supply system of claim 10,
wherein the computer system is configured to obtain time series data of the power demand of the drilling rig,
wherein comparing the power demand to the battery power threshold includes a comparison of the time series data to a first power threshold and a second power threshold that is lower than the first power threshold,
wherein the power demand is determined to be less than or equal to the battery power threshold when condition (1) or condition (2) is satisfied:
 (1) the time series data is less than or equal to the first power threshold over a first time duration;
 (2) the time series data is less than or equal to the second power threshold over a second time duration that is shorter than the first time duration, and
wherein the power demand is determined to be greater than the battery power threshold when:
 the time series data fails to satisfy condition (1) or condition (2); or
 the time series data exceeds the battery power threshold at any point.

12. The energy supply system of claim 10,
wherein the computer system is configured to obtain information from the drilling rig,
wherein the information indicates whether or not a piece of electrically powered equipment on the drilling rig is operating,
wherein, in addition to comparing the power demand to the battery power threshold, entering stealth mode further requires that the piece of electrically powered equipment on the drilling rig is not operating above a predetermined threshold for a predetermined amount of time.

13. The energy supply system of claim 10,
wherein, before comparing the power demand to the battery power threshold, the computer system is configured to determine a state of charge of the battery storage,
wherein when the state of charge of the battery storage is less than a charged threshold, the computer system connects at least one of the one or more generators to the electrical bus to power the drilling rig and to charge the battery storage until the charged threshold is reached,
wherein when the state of charge of the battery storage is greater than or equal to the charged threshold, the computer system proceeds with comparing the power demand to the battery power threshold, and
wherein the computer system is configured to further require that the state of charge of the battery storage is greater than or equal to the charged threshold to enter stealth mode.

14. The energy supply system of claim 13,
wherein the battery storage includes a plurality of battery packs that each include a plurality of batteries connected in series, and
wherein the computer system is configured to further require that each battery pack of the battery storage has a state of charge greater than or equal to a predetermined threshold to enter stealth mode.

15. The energy supply system of claim 10,
wherein, while in the stealth mode, the computer system is configured to monitor information that includes an update of the power demand of the drilling rig, and
wherein when the information satisfies an exit condition, the energy supply system exits the stealth mode by:
 activating and increasing a load of one of the one or more generators above a predetermined efficiency threshold; and
connecting the one of the one or more generators to the electrical bus to power the drilling rig and charge the battery storage.

16. The energy supply system of claim 15,
wherein the computer system is configured to obtain a portion of the information from the drilling rig,
wherein the information includes operational information from the drilling rig, and
wherein the exit condition is immediately satisfied when the operational information indicates a predetermined piece of electrically powered equipment on the drilling rig is operating above a predetermined threshold.

17. The energy supply system of claim 15,
wherein the computer system is configured to obtain time series data of the power demand of the drilling rig,
wherein the exit condition includes a comparison of the time series data to:
 a first exit threshold that is greater than the battery power threshold; and
 a second exit threshold that is greater than the first exit threshold;
wherein the exit condition is satisfied when condition (1) or condition (2) is satisfied:
 (1) the time series data is greater than the first exit threshold over a first time duration;
 (2) the time series data is greater than the second exit threshold over a second time duration that is shorter than the first time duration, and
wherein the exit condition is not satisfied when the time series data fails to satisfy condition (1) and condition (2).

18. The energy supply system of claim 10,
wherein, when entering the stealth mode, the computer system is configured to transmit a command to the drilling rig that limits operation of a drawworks, a mud pump, or a top drive.

19. A non-transitory computer readable medium (CRM) storing computer readable program code for operating a drilling rig, that includes electrically powered equipment, and an energy supply system, that includes a battery storage, one or more generators, and an electrical bus that powers the drilling rig, wherein the computer readable program code causes a computer system to:
 determine a power demand of the drilling rig;
 compare the power demand to a battery power threshold, wherein the battery power threshold is associated with a maximum continuous power output of the energy supply system at a given time;
 when the power demand is less than or equal to the battery power threshold, the computer system commands the energy supply system to enter a stealth mode by deactivating and disconnecting all generators from the electrical bus and powering the electrical bus and the drilling rig with only the battery storage; and when the power demand is greater than the battery power threshold, the computer system commands the energy supply system to power the electrical bus with at least one of the one or more generators, wherein the battery power threshold is based on a maximum power output rating of the battery storage.

20. The non-transitory computer readable medium of claim 19, wherein the computer readable program code further causes the computer system to obtain time series data of the power demand of the drilling rig, wherein comparing the power demand to the battery power threshold includes a comparison of the time series data to a first power threshold and a second power threshold that is lower than the first power threshold, wherein the power demand is determined to be less than or equal to the battery power threshold when condition (1) or condition (2) is satisfied:
  (1) the time series data is less than or equal to the first power threshold over a first time duration;
  (2) the time series data is less than or equal to the second power threshold over a second time duration that is shorter than the first time duration, and wherein the power demand is determined to be greater than the battery power threshold when:
  the time series data fails to satisfy condition (1) or condition (2); or
the time series data exceeds the battery power threshold at any point.

* * * * *